VAPOR DIFFUSION SYSTEM FOR SEMICONDUCTORS

Filed Feb. 14, 1968 2 Sheets-Sheet 1

INVENTOR.
Dillon R. Traxler
BY
R. J. Wallace
ATTORNEY

INVENTOR.
Dillon R. Traxler
BY
R. J. Wallace
ATTORNEY 3,589,953

VAPOR DIFFUSION SYSTEM FOR SEMICONDUCTORS

Dillon R. Traxler, Sharpsville, Ind., assignor to General Motors Corporation, Detroit, Mich.

Filed Feb. 14, 1968, Ser. No. 705,509
Int. Cl. C23c *13/04, 13/12*
U.S. Cl. 148—189 11 Claims

ABSTRACT OF THE DISCLOSURE

An improved system for vapor diffusing a conductivity-type determining impurity into a plurality of semiconductor bodies simultaneously. The semiconductor bodies and a source of impurity are placed within a closed but unsealed heat insulated enclosure within a vacuum chamber. Heat is generated and maintained within the enclosure to establish an atmosphere of impurity vapor therewithin to effect diffusion.

BACKGROUND OF THE INVENTION

This invention concerns the vapor diffusion of a conductivity-type determining impurity into a plurality of semiconductor bodies simultaneously. More particularly, it involves an improved commercial production method and apparatus by which larger numbers of semiconductor bodies can be treated with a vapor diffusant while simultaneously obtaining a high degree of uniformity in surface concentration and diffusion penetration among said bodies.

Conventionally, vapor diffusion is conducted within a tubular vacuum furnace with the source of impurity at one end of the tube and means for evacuating the tube at the other end. Semiconductor bodies which are to be treated are placed along the length of the tube within a region of high temperature. Unfortunately, the ceramic tube is composed of a ceramic, such as mullite, which may have an affinity for the diffusant, e.g. aluminum, being used. If so, extensive pretreatment of the tube is required to reduce this affinity. Unless the ceramic tube is pretreated there is a significant drop in the partial pressure of the impurity as it travels along the length of the tubes. Consequently, there is a progressive reduction in surface concentration and diffusion penetration of impurity in the semiconductor bodies progressively located along the length of the tube in a direction away from the source of impurity. Moreover, the useful life of such a tube is limited because after a limited number of diffusion runs, the surface concentration and diffusion penetrations become increasingly erratic. This is particularly a problem when preparing high voltage junctions in silicon with vapor diffused aluminum. In some instances the ceramic tube must be replaced and discarded after only 30 or 40 diffusion runs, even if it has been pretreated.

Further in the conventional tube type diffusion furnace the number or semiconductor bodies treated simultaneously is limited, if one is to obtain uniformity among the semiconductor bodies treated in a given batch. Moreover, even with extreme care there is frequently a large variation in surface concentration and diffusion penetration between batches of semiconductor bodies treated.

While surface concentration may not be especially important in the manufacture of some semiconductor devices, it is of critical importance in the manufacture of high voltage semiconductor devices. Aluminum, for example, can be used to provide an extremely satisfactory high voltage junction in silicon. However, consistent acquisition of a predetermined surface concentration and diffusion penetration is extremely difficult to obtain with a conventional tube type diffusion furnace. Consequently, commercial production of vapor diffused aluminum doped high voltage silicon devices has been limited.

SUMMARY OF THE INVENTION

It is, therefore, a principal object of this invention to provide a practical and economical system for vapor diffusing an impurity into a large number of semiconductor bodies simultaneously while concurrently obtaining extremely controlled surface concentration and diffusion penetration of said impurity.

It is a further object to provide an improved diffusion apparatus and method which is particularly successful in obtaining precise control of surface concentration and diffusion penetration of even such difficult to diffuse impurities as aluminum.

Another object of the invention is to provide a method and apparatus for providing increased yields for high surface concentration diffusions of impurities into semiconductors.

These and other objects of the invention are accomplished by establishing a precisely controlled partial pressure of impurity vapor within a substantially closed but unsealed enclosure within a vacuum chamber, and exposing the semiconductor bodies to be treated to a predetermined, carefully controlled, substantially uniform temperature and concentration of aluminum vapor for a sufficient duration to effect diffusion of the vapor to the desired depth into the semiconductor body.

BRIEF DESCRIPTION OF THE DRAWING

Other objects, features and advantages of the invention will become more apparent from the following description of preferred examples thereof and from the drawing, in which.

DESCRIPTION OF THE PREFERRED EMBODIMENTS

Figure 1:
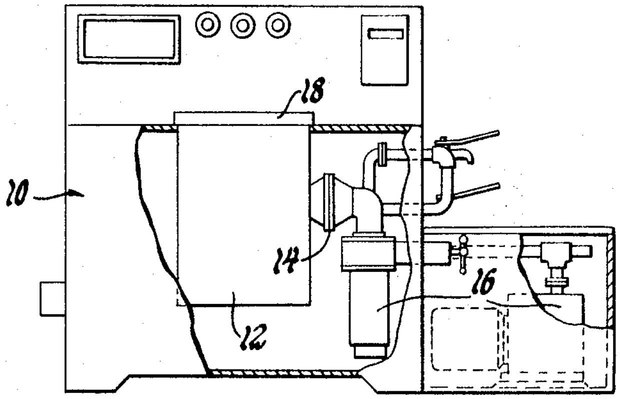
FIG. 1 shows a schematic view with parts broken away of an apparatus for producing conventional evaporated metal coatings under vacuum conditions.

FIG. 1 shows a conventional vacuum evaporation apparatus 10 such as can be used to practice the invention. The apparatus has a vacuum chamber 12, with an opening in the side wall thereof connected at 14 to appropriate roughing and diffusion pumps designated by reference numeral 16. The vacuum chamber 12 has a removable cover 18 for gaining access to the vacuum chamber.

Figure 2:
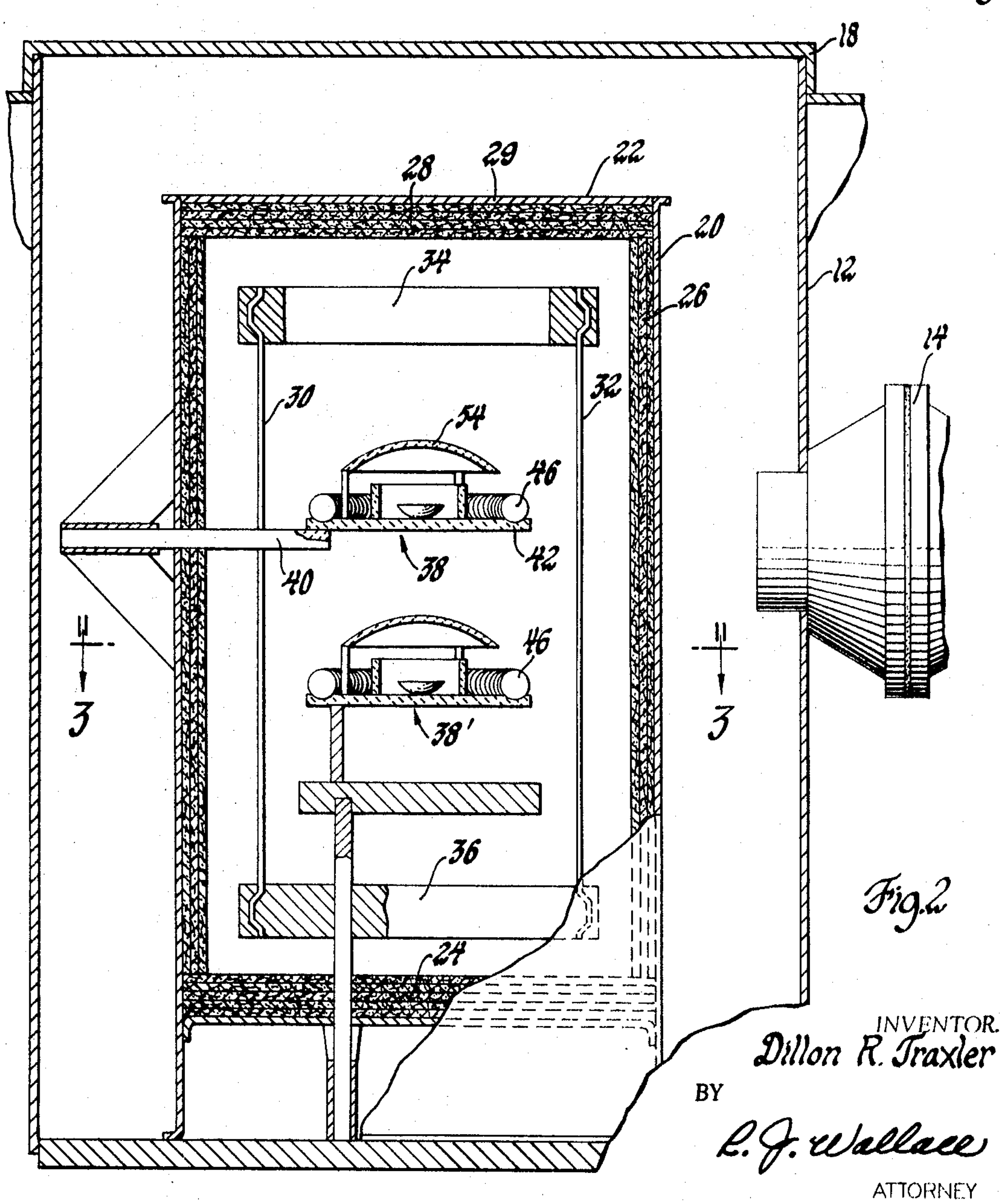
FIG. 2 shows a sectional view of the vacuum chamber in the apparatus shown in FIG. 1 as it is modified in accordance with this invention.

FIG. 2 shows an enlarged sectional view of the vacuum chamber 12 of the apparatus shown in FIG. 1. The vacum chamber 12 contains a substantially closed but unsealed metal enclosure 20 having removable cover assembly 22 for gaining access to the interior of the enclosure. The bottom wall of the enclosure is completely covered with a multi-layer lining 24 of graphite felt to prevent heat loss to the exterior of enclosure 20. The side wall of enclosure 20 is also covered with an insulating multi-layer graphite felt lining 26. Enclosure cover assembly 22 has a multi-layer graphite felt portion 28 which rests on the upper edge of lining 26 in a fairly tight fitting relationship with the mouth of enclosure 20. The metal portion 29 of cover assembly 22 principally serves as a carrier for the felt portion 28.

Cover assembly 22 substantially closes enclosure 20 but does not seal it. Since it is not sealed it is readily evacuated at the same time the vacuum chamber 12 is evacuated. On the other hand, it is sufficiently insulated and sealed to prevent any rapid loss of heat or vapor which is generated therewithin under diffusion conditions.

Graphite cloth resistance heating elements 30 and 32 vertically extend between horizontal connecting rings 34 and 36 which in turn communicate with a source of electric potential (not shown). The graphite cloth heaters form a vertical generally columnar region of substantially uniform temperature within the enclosure 20. While only two such heaters are shown, more may be desirable in some instances to obtain greater uniformity of temperature within enclosure 20. I have found that in most instances three graphite cloth strips approximately three inches wide uniformly spaced around a vertical axis are satisfactory.

A semiconductor slice holder and diffusant source assembly 38 is supported within the columnar region established by the heaters 30 and 32 on a plurality of support members 40, only one of which is shown. A similar semiconductor slice holder and diffusant source assembly 38' is supported beneath slice holder assembly 38.

Figure 3:
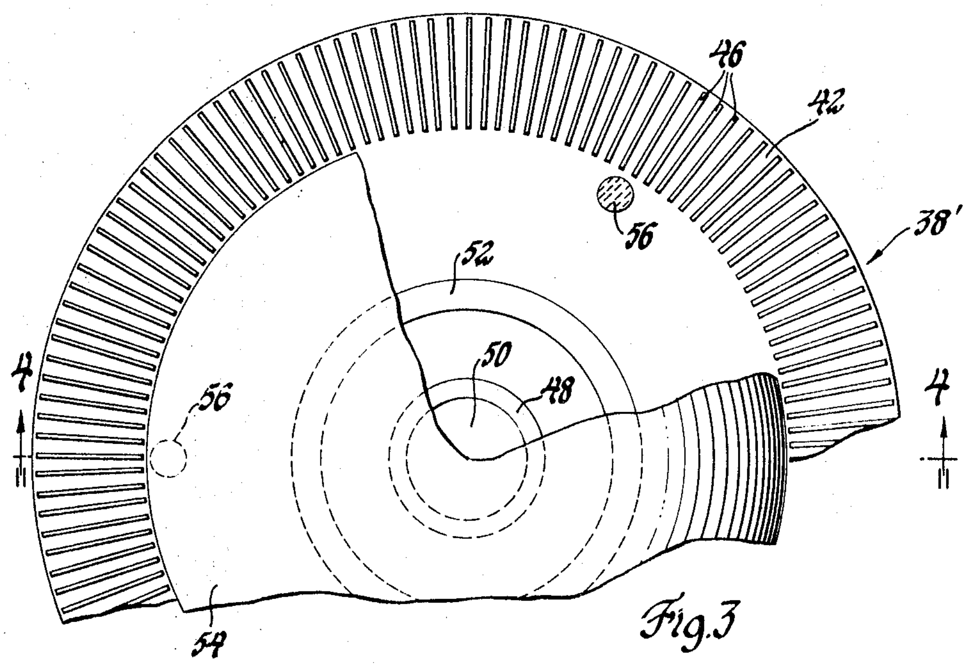
FIG. 3 shows a view along the lines 3—3 of FIG. 2.
Figure 4:
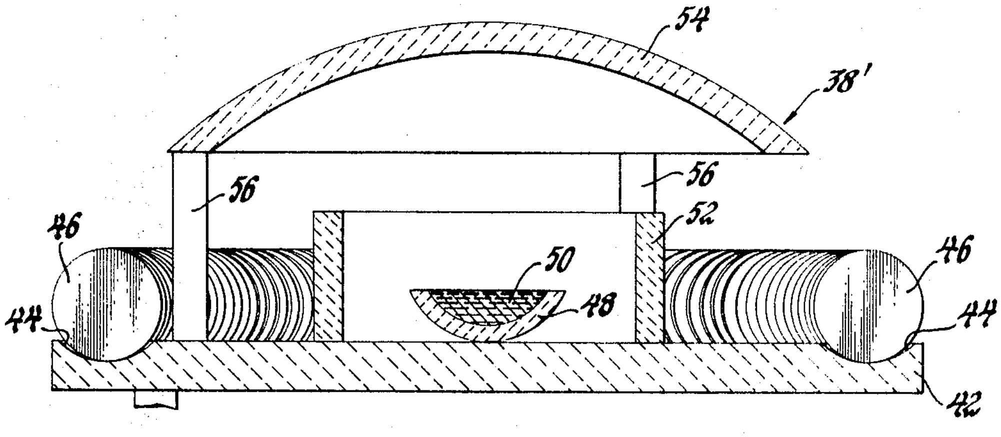
FIG. 4 shows a view along the lines 4—4 of FIG. 3.

Details of the semiconductor slice holder and diffusant source assemblies 38 and 38' can be seen better in connection with FIGS. 3 and 4. The assemblies comprise a ceramic disk element 42 having a plurality of radial grooves 44 on its periphery, each of which supports a semiconductor slice 46 on edge. When all of the grooves are filled with semiconductor slices, the slices form a toroid, which surrounds a crucible 48 containing aluminum 50. The aluminum filled crucible 48 is the source of diffusant for the vapor diffusion process to be carried out within enclosure 20.

Tubular element 52 effectively isolates the semiconductor slices 46 from any flash or splash that may emanate from the crucible 48 as the aluminum is evaporating under diffusion conditions. Analogously, an inverted ceramic circular dish-like element 54 is spaced above tubular element 52 on appropriate ceramic supports 56. Dish-like member 54 assists circular wall 52 in that it prevents liquid metal from splashing upwardly above the circular wall and then back down onto the toroid of semiconductor slices. It also facilitates the diffusion process by aiding in directing aluminum vapors emanating from the crucible 48 onto the toroid of semiconductor slices.

To establish a partial pressure of aluminum within enclosure 20 one pumps down the chamber 12 to an appropriately low vapor diffusion pressure, such as less than 100 microns of mercury. Concurrently, evacuation of enclosure 20 to the same low pressure will also occur. Current is passed through resistance heaters 30 and 32 to heat the enclosure to an appropriate diffusion temperature, such as approximately 1210° C. One can continue heating to maintain the enclosure at diffusion temperature for approximately one-half hour to obtain an effective diffusion. The particular temperature selected for diffusion and the duration for which that temperature is maintained is, of course, determined by the surface concentration and the diffusion penetration which is desired. For higher voltage junctions of N-type silicon having a resistivity in excess of 20 ohm-centimeters the above-described sequence is preferred. After the diffusion has been carried out for a sufficient duration, heating is discontinued, the vacuum chamber backfilled with appropriate atmosphere, as for example argon, and the assembly allowed to cool. When sufficiently cool, covers 18 and 22, respectively, from the vacuum chamber 12 and enclosure 20 are removed. The slice holder and source assemblies 38 and 38' can then be taken out of enclosure 20 for further processing into a finished device.

While I prefer to use graphite cloth resistance heaters within enclosure 20, other forms of heating may be used. However, one may have to pretreat other types of resistance heaters, to avoid contamination of the vapor diffusion system. Moreover, care should be exercised that these other resistance heaters are not reactive with the impurity atmosphere being established within enclosure 20.

I have disclosed using a plurality of layers of graphite felt as a heat shield to insulate the interior of enclosure 20. In some instances only one layer may be adequate, and other lining materials may be preferred. Sufficient insulation is used to keep enclosure 20 hot enough to establish and maintain a partial pressure of aluminum vapor within the enclosure. Heat loss can also be prevented by insulating the exterior of enclosure 20 or providing some other form of heat shield such as a plurality of spaced metal layers on either the inside or outside of enclosure 20.

The interior graphite felt lining is preferred as the heat shield for another reason. It concurrently also presents an extremely large surface area of carbon within the enclosure 20. During the diffusion the carbon will getter the atmosphere within enclosure 20 of any residual oxygen or water which may be present therein. The carbon has such a high affinity for water and oxygen, that it will be preferentially oxidized instead of the semiconductor or the diffusant vapor. Thus, the system is continuously purified and one can realize uniform high quality in the semiconductor bodies being treated. Hence, one can consistently obtain yields with even the most oxygen sensitive diffusants such as aluminum.

The enclosure 20 as previously indicated is substantially closed so that a partial pressure of aluminum vapor, an aluminum atmosphere, can be established and retained within it. It is also substantially closed to effectively retain heat generated within it. On the other hand, it is not sealed because it is necessary to evacuate the enclosure to carry out the diffusion process within it. Hence, enclosure 20 is substantially closed but unsealed by the graphite felt cover layers 28. Layers 28 can be made somewhat oversize to engage closely with the side walls of the enclosure 20 to insure substantial closure. A metal cover over the top can also insure substantial closure but may not be necessary if the lining material is close fitting and self-supporting.

FIG. 2 shows my preferred embodiment in which a separate source is used for each toroid of semiconductor slices in enclosure 20. However, I have made satisfactory diffusions even when the source of impurity for the lower toroid of slices is omitted. However, yields were not quite as good. Analogously, the tubular element 52 and dish-like member 54 can be deleted. However, if they are not used, yields become non-uniform and generally decrease due to splashing and flashing of the source during evaporation. Liquid globules can be propelled onto the semiconductor slices, making the slices unsatisfactory. When such flashing or splashing does not occur, protective elements 52 and 54 are not necessary.

It is to be understood that although this invention has been described in connection with certain specific examples thereof, no limitation is intended thereby except as defined in the appended claims.

I claim:

1. A method for vapor diffusing a conductivity-type determining impurity into a plurality of semiconductor bodies simultaneously with improved uniformity of impurity surface concentration and diffusion penetration among said bodies, said method comprising the steps of placing a plurality of semiconductor bodies within a substantially closed but unsealed enclosure within a vacuum chamber, providing a source of said impurity in said enclosure, said enclosure including thermal insulation, heating said insulated enclosure from within, said thermal insulation substantially preventing loss of heat from said enclosure and heating of said vacuum chamber to thereby establish a significant partial pressure of impurity vapor substantially only within said enclosure, and continuing to heat said enclosure from within for a sufficient duration to diffuse said impurity vapor into said semiconductor bodies.

2. An improved method for vapor diffusing a conductivity-type determining metallic impurity into a plurality of semiconductor bodies simultaneously, said method comprising the steps of placing a source of said metallic impurity within a substantially closed but unsealed enclosure within a vacuum chamber, said enclosure including thermal insulation, arraying a plurality of semiconductor bodies adjacent said source within said enclosure, evacuating said vacuum chamber, heating said enclosure to vapor diffusion temperatures from within, said thermal insulation substantially preventing loss of heat from said enclosure and heating of said vacuum chamber to thereby establish a significant partial pressure of impurity vapor essentially only within said enclosure, preventing liquid splash emanating from said source during evaporation from contacting said semiconductor bodies, and continuing to heat said enclosure from within for a sufficient duration to diffuse said impurity vapor into the surface of said semiconductor bodies to a predetermined depth.

3. The improved method of vapor diffusing a metallic impurity into a plurality of semiconductor bodies simultaneously as defined in claim 2 wherein the impurity is aluminum, the semiconductor bodies are of silicon, and the interior of said enclosure has an extensive exposed surface area of carbon to getter the atmosphere within said enclosure of any residual oxygen and water vapor therewithin.

4. The improved method of vapor diffusing a metallic impurity into a plurality of semiconductor bodies simultaneously as defined in claim 2 wherein the impurity is aluminum, the semiconductor bodies are thin slices of silicon, the slices of silicon are radially arrayed around the aluminum source as a horizontal toroid within a substantially uniform temperature and aluminum vapor pressure region within said enclosure, and an extremely pure partial pressure of aluminum is maintained within said enclosure with a heat insulating graphite felt lining on the inner surfaces of said enclosure.

5. An improved apparatus for highly uniformly vapor diffusing a conductivity-type determining impurity into a plurality of semiconductor bodies simultaneously, said apparatus having a chamber, means for evacuating the chamber, a substantially closed but unsealed enclosure within said chamber, means within the enclosure for heating the interior thereof to a temperature above the boiling point of said impurity to establish a partial pressure of said impurity within said enclosure, means for thermally insulating said enclosure to substantially prevent transfer of heat produced by said heating means through the walls of said enclosure into said chamber, a source of said impurity within said enclosure, and means for supporting a plurality of semiconductor bodies within said enclosure to expose them to said impurity vapor.

6. The improved apparatus for vapor diffusion described by claim 5 wherein the means for inhibiting heat loss from said enclosure and said heating means are so arranged and constructed to produce a substantially uniform temperature and impurity partial pressure region within said enclosure, and said semiconductor body support means holds the semiconductor bodies within this region for diffusion.

7. An improved apparatus for highly uniformly vapor diffusing a conductivity-type determining metallic impurity into a plurality of semiconductor bodies simultaneously, said apparatus comprising a vacuum chamber, means for evacuating said chamber, an unsealed enclosure within said chamber within which an atmosphere of impurity vapor can be established, at least one resistance heater vertically disposed within said enclosure to establish a generally columnar region of substantially uniform temperature within said enclosure, insulating means for said enclosure for maintaining said columnar region of substantially uniform temperature and for substantially preventing heating of said chamber by said heater, a source of said metallic impurity within said columnar region, a plurality of semiconductor bodies radially arrayed around said source within said columnar region, and means for preventing liquid splash emanating from said source from contacting said semiconductor bodies.

8. The improved apparatus as defined in claim 7 wherein the metallic impurity is aluminum, the semiconductor bodies are of silicon and an extensive exposed surface of carbon is provided within said enclosure.

9. The improved apparatus as defined in claim 8 wherein the extended surface of carbon is provided by a graphite felt lining on the inner surface of said enclosure in sufficient thickness to also serve as a means for retaining heat generated within the enclosure.

10. An improved apparatus for highly uniformly vapor diffusing aluminum into a plurality of semiconductor bodies simultaneously, said apparatus comprising a vacuum chamber, a substantially closed but unsealed enclosure within said vacuum chamber, means for evacuating said chamber, a multi-layer graphite felt lining on the interior of said enclosure, a plurality of graphite cloth resistance heaters within said chamber for forming a vertical columnar region of substantially uniform temperature within said enclosure, a crucible containing aluminum within the columnar region established by said heaters, means for radially arraying a plurality of semiconductor slices as a horizontal toroid surrounding said crucible, a tubular wall between said crucible and said toroid of slices for preventing liquid emanating from the crucible from contacting said slices, and an inverted dish-like element of larger diameter than said tubular wall spaced above the wall to assist in directing vapors emanating from said source toward said toroid of slices and assist in preventing liquid emanations from said source from contacting said toroid of slices.

11. The improved apparatus as described in claim 10 wherein means are provided to support a plurality of vertically spaced groups of slices within the vertical columnar region established by the graphite cloth heaters within said enclosure.

References Cited

UNITED STATES PATENTS

| | | | |
|---|---|---|---|
| 2,879,739 | 3/1959 | Bugbee et al. | 161—Carbon |
| 3,102,633 | 9/1963 | Baronetzky | 206—.4 |
| 3,201,290 | 8/1965 | Wyss | 118—48UX |
| 3,205,102 | 9/1965 | McCaldin | 148—189 |
| 3,239,403 | 3/1966 | Williams et al. | 161—Carbon |
| 3,293,074 | 12/1966 | Nickl | 148—175UX |
| 3,316,386 | 4/1967 | Yaffe et al. | 118—49X |
| 3,328,213 | 6/1967 | Topas | 148—189UX |

FOREIGN PATENTS

| | | | |
|---|---|---|---|
| 564,618 | 10/1958 | Canada | 148—189 |

ALLEN B. CURTIS, Primary Examiner

U.S. Cl. X.R.

118—49; 161—Carbon; 206—.4